United States Patent
Clark et al.

(10) Patent No.: US 10,354,043 B2
(45) Date of Patent: Jul. 16, 2019

(54) PRINTED CIRCUIT BOARD DESIGN FOR MANUFACTURING ACROSS MULTIPLE SUPPLIERS

(71) Applicant: Mentor Graphics Corporation, Wilsonville, OR (US)

(72) Inventors: Max Clark, Dove Canyon, CA (US); Victor Kurman, Sharon (IL)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 15/470,561

(22) Filed: Mar. 27, 2017

(65) Prior Publication Data

US 2017/0277822 A1 Sep. 28, 2017

Related U.S. Application Data

(60) Provisional application No. 62/313,555, filed on Mar. 25, 2016.

(51) Int. Cl.
*G06F 17/50* (2006.01)

(52) U.S. Cl.
CPC ...... *G06F 17/5081* (2013.01); *G06F 2217/06* (2013.01); *G06F 2217/12* (2013.01)

(58) Field of Classification Search
CPC .................................................. G06F 17/5081
USPC .......................................................... 716/136
See application file for complete search history.

(56) References Cited

U.S. PATENT DOCUMENTS

| | | | | |
|---|---|---|---|---|
| 2009/0031273 | A1* | 1/2009 | Tsai | G06F 17/5068 716/119 |
| 2013/0049762 | A1* | 2/2013 | Ogg | H01M 10/4207 324/433 |
| 2015/0192620 | A1* | 7/2015 | Chang | G06F 17/5081 702/65 |
| 2015/0302130 | A1* | 10/2015 | Hirschman | G06F 17/5072 716/137 |

* cited by examiner

*Primary Examiner* — Suchin Parihar
(74) *Attorney, Agent, or Firm* — Mentor Graphics Corporation (57) ABSTRACT

This application discloses a computing system to parse a product model definition that includes a layout design of a printed circuit board assembly, which identifies physical design characteristics of the layout design of the printed circuit board assembly. The computing system can identify one or more manufacturing processes capable of manufacturing at least a portion of the printed circuit board assembly having the identified physical design characteristics. The computing system can include a map or correlation between the manufacturing processes and manufacturing-related design constraints. The computing system can select one or more manufacturing checks that define manufacturing-related design constraints correlated to the identified manufacturing processes. The computing system can perform a manufacturing analysis, by implementing the manufacturing checks, which can determine whether the layout design of the printed circuit board assembly conforms to the manufacturing-related design constraints defined in the manufacturing checks.

14 Claims, 5 Drawing Sheets

PRINTED CIRCUIT BOARD DESIGN FOR MANUFACTURING ACROSS MULTIPLE SUPPLIERS

RELATED APPLICATIONS

This application claim benefit of and priority to U.S. Provisional Patent Application No. 62/313,555, filed Mar. 25, 2016, which is incorporated by reference herein.

TECHNICAL FIELD

This application is generally related to electronic design automation and, more specifically, to design for manufacturing analysis for printed circuit board assembly manufactured across multiple suppliers.

BACKGROUND

The development of electronic devices with printed circuit boards typically involves many steps, known as a design flow. This design flow typically starts with a specification for a new circuit to be implemented with a printed circuit board. The specification of the new circuit can be transformed into a circuit design, such as a netlist, for example, by a schematic capture tool or by synthesizing a logical circuit design, sometimes referred to as a register transfer level (RTL) description of the circuit. The netlist, commonly specified in an Electronic Digital Exchange Format (EDIF), can describe nets or connectivity between various devices or instances in the circuit design.

The design flow continues by verifying functionality of the circuit design, for example, by simulating or emulating the circuit design and verifying that the results of the simulation or emulation correspond with an expected output from the circuit design. The functionality also can be verified by statically checking the circuit design for various attributes that may be problematic during operation of an electronic device built utilizing the circuit design.

Once the circuit design has been functionally verified, the design flow continues to design layout and routing, which includes placing and interconnecting various components into a representation of a printed circuit board. This procedure can be implemented in many different ways, but typically, through the use of a layout tool, which can allow a designer to drag or place parts from a library onto the printed circuit board. The layout tool can validate the electronic device and perform various design rule checks on placed parts to ensure that the electronic device can be effectively manufactured. The layout design for the printed circuit board can be included in file specified in an ODB++ (Open Database++) format, a Gerber-based format, or the like.

The design flow may perform one or more design for manufacturability (DFM) procedures on the layout design, which can determine whether the electronic device described in the layout design can be manufactured. The design for manufacturability procedures can include a design for fabrication (DFF) processes, a design for assembly (DFA) processes, a design for test (DFT) processes, or the like. The design for fabrication processes can determine whether a bare printed circuit board can be fabricated based on the layout design. The design for assembly processes can determine whether components can be disposed or coupled to the printed circuit board during assembly of the electronic device. The design for test processes can identify whether testing procedures can be utilized on manufactured electronic devices, for example, to detect process defects during assembly, perform electrical verification of a manufactured electronic device, or the like.

A design for manufacturing (DFM) tool can apply a set of constraints corresponding to manufacturing capabilities of the particular manufacturer to a layout design of the printed circuit board, and generate results that indicate where the layout design deviates from the set of constraints. Since the constraints are design-agnostic, many of the applied constraints may not be relevant to a particular layout design. The results therefore can include false-positives in the reports of deviations for the designer to manually review. Based on the review of the results, the designer can revise the layout design and re-apply the constraints, sometimes iteratively, until the designer achieves a layout design of the printed circuit board that can be manufactured by the particular manufacturer.

Some designers have attempted to reduce the burden associated with applying design-agnostic constraint sets by manually building constraint sets customized to the layout design for the design for manufacturing tool. This customized approach for performing design for manufacturing analysis is a time-consuming process often with extensive manual interaction with the design for manufacturing tool, such as manual generation of engineering rules file (ERF) models for each check in checklist. Since a single manufacturer can have hundreds of different factors, such as a final finish on the copper, a solder mask application, or the like, and technologies, such as a blind drill, buried drill, back drill, micro via, or the like, which can be utilized in the manufacture the printed circuit board assembly described by the layout design, the customized approach for performing design for manufacturing analysis becomes nearly impractical due to complexity arising from the number of factors and technologies to consider.

Many developers further have multiple different manufacturers or suppliers that they can utilize to manufacture the printed circuit board from the layout design. These developers typically perform the design for manufacturing analysis for a single manufacturer and then make the assumption that the resulting layout design can also be implemented by other manufacturers. As printed circuit board technology and associated manufacturing processes have become more sophisticated, the previous assumption of universal manufacturability has not held, resulting in reduction of yield and product quality.

SUMMARY

This application discloses a computing system implementing a design for manufacturing tool to parse a product model definition that includes a layout design of a printed circuit board assembly. The computing system implementing the design for manufacturing tool can identify physical design characteristics of the layout design of the printed circuit board assembly based on the parsing of the product model definition. The computing system implementing the design for manufacturing tool can identify one or more manufacturing processes capable of manufacturing at least a portion of the printed circuit board assembly having the identified physical design characteristics. The computing system implementing the design for manufacturing tool can include a map or correlation between the manufacturing processes and manufacturing-related design constraints. The computing system implementing the design for manufacturing tool can select one or more manufacturing checks that define manufacturing-related design constraints correlated to the identified manufacturing processes. The computing system implementing the design for manufacturing tool can perform a manufacturing analysis, by implementing the manufacturing checks, which can determine whether the layout design of the printed circuit board assembly conforms to the manufacturing-related design constraints defined in the manufacturing checks. Embodiments will be described below in greater detail.

DETAILED DESCRIPTION

Illustrative Operating Environment

Figure 1:
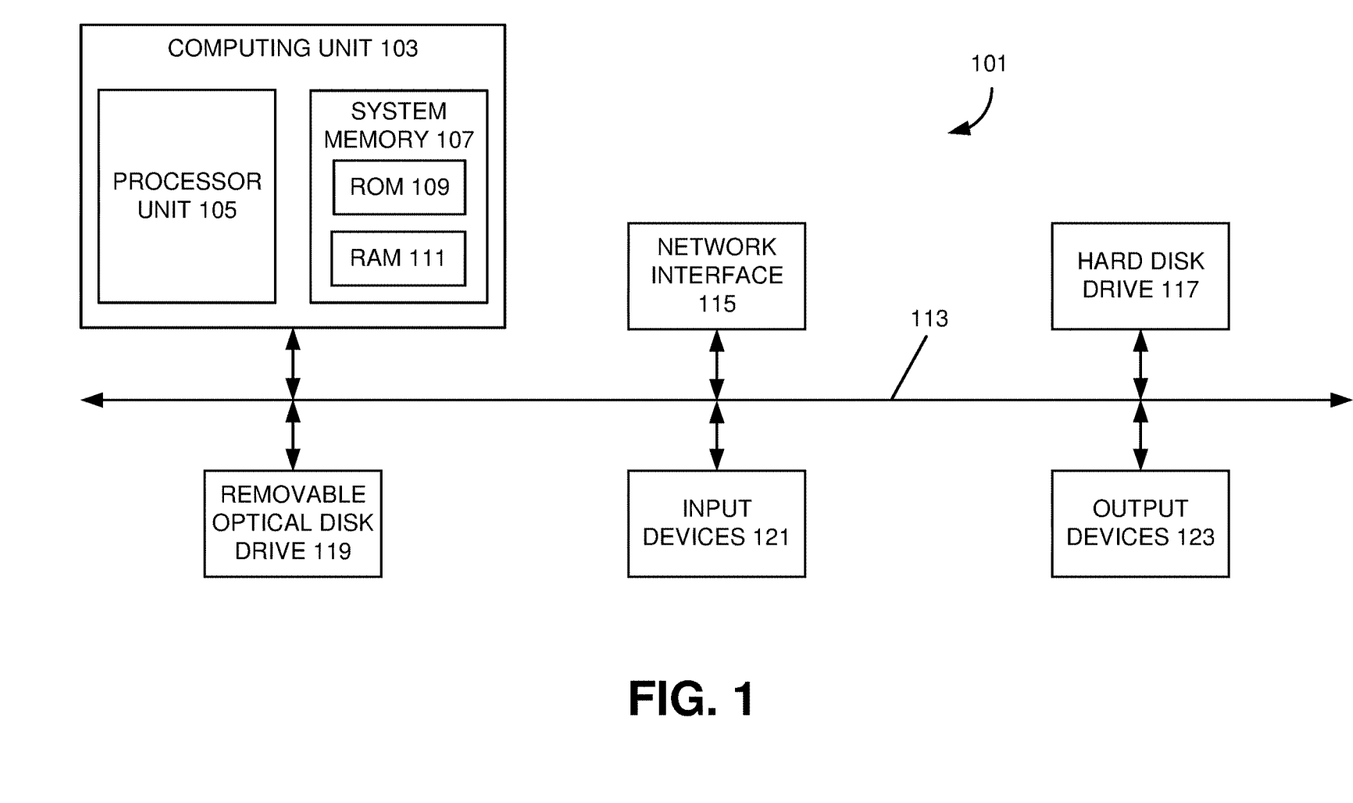
FIGS. 1 and 2 illustrate an example of a computer system of the type that may be used to implement various embodiments.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
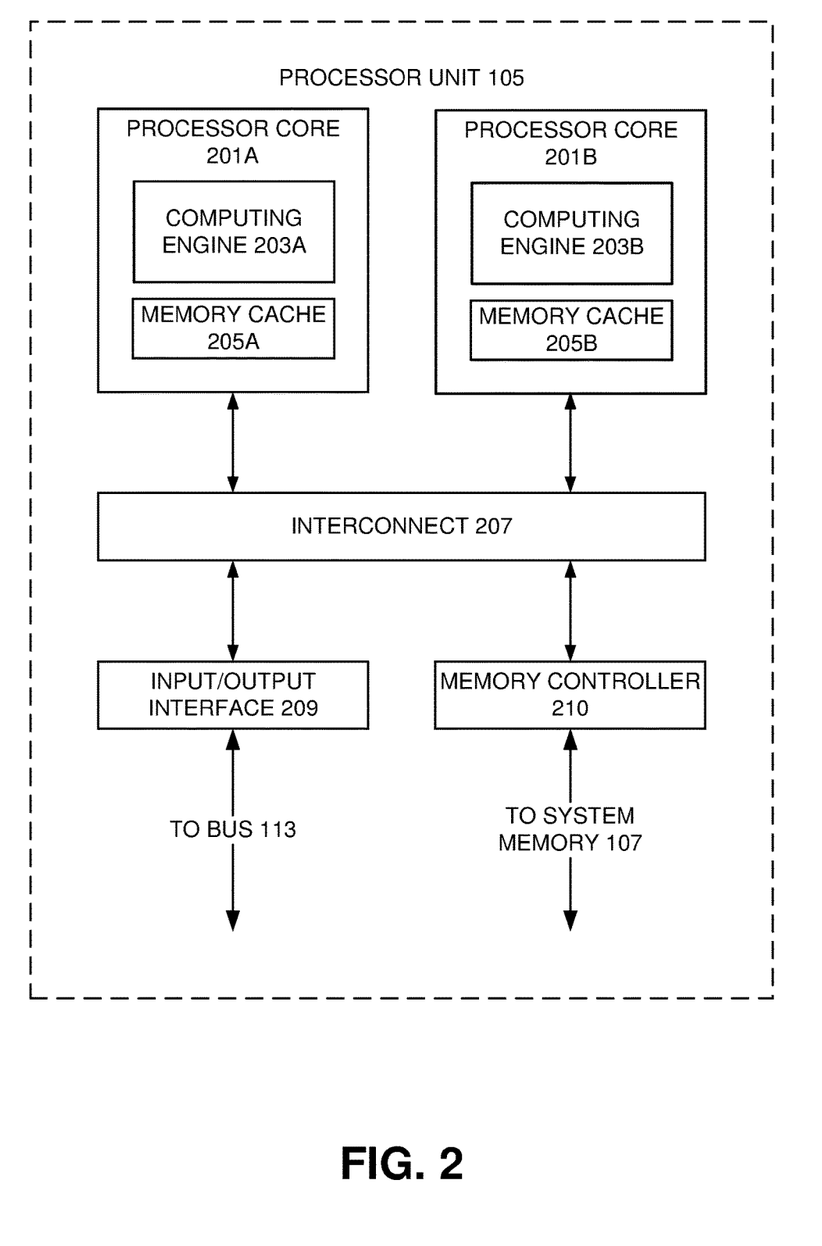

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Figure 3:
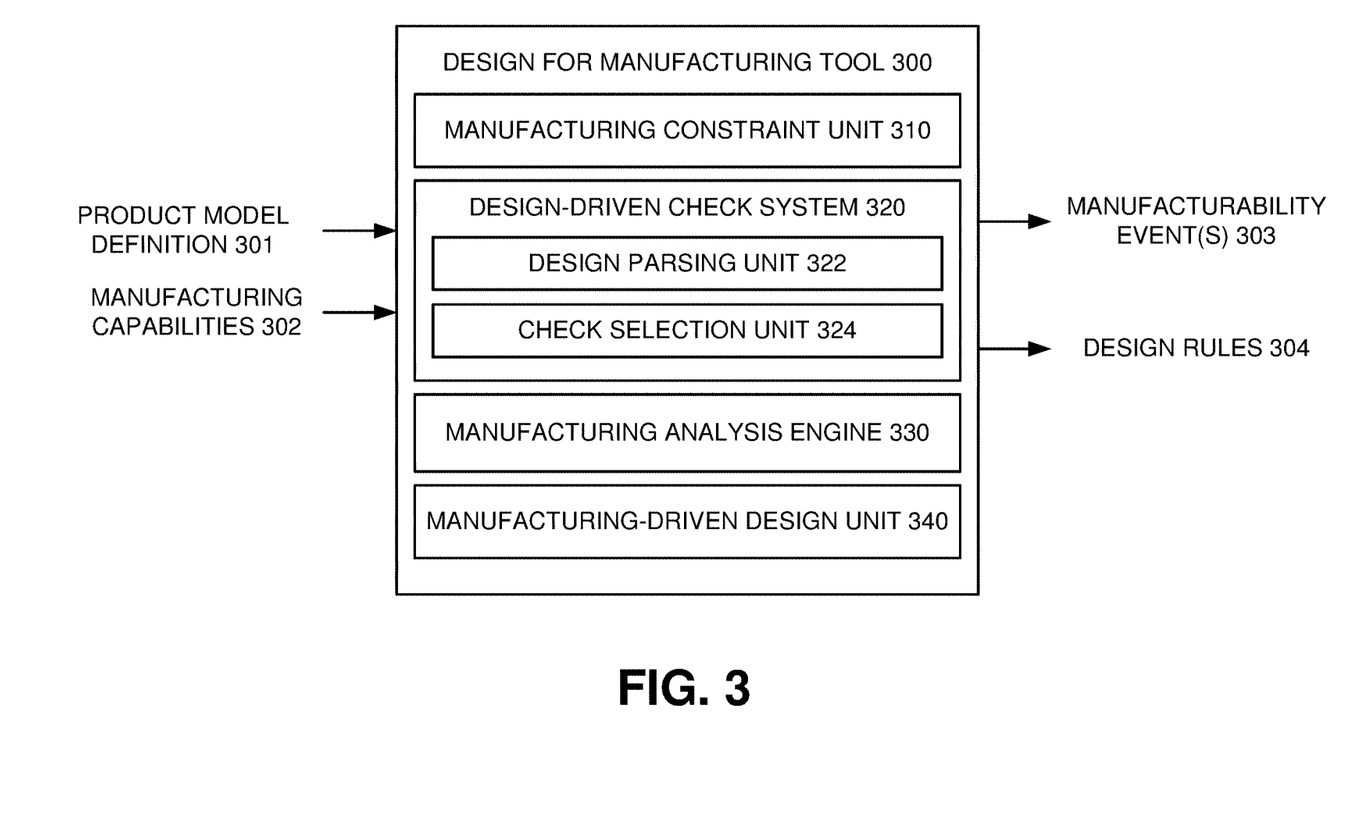
FIG. 3 illustrates an example of a design for manufacturing tool to perform a manufacturing analysis on a product model definition with process-aware selection of manufacturing checks according to various embodiments.

Design for Manufacturing of a Printed Circuit Board Assembly Across Multiple Suppliers FIG. 3 illustrates an example of a design for manufacturing (DFM) tool 300 to perform a manufacturing analysis on a product model definition 301 with process-aware selection of manufacturing checks according to various embodiments. Referring to FIG. 3, the design for manufacturing tool 300 can be implemented in a computing system, such as on a computing device 101 described in FIG. 1, or the like. The design for manufacturing tool 300 can receive the product model definition 301 describing a printed circuit board assembly, which can be specified in an ODB++ (Open Database++) format, a modified Gerber format, or the like. The product model definition 301 can include information describing how to fabricate a bare printed circuit board and information describing how to assemble components on the bare printed circuit board, which can generate the printed circuit board assembly. In some embodiments, the product model definition 301 can include a layout design of the printed circuit board assembly, and can define a stage of a design layout process, assembly process methods, a printed circuit board layer count, a board thickness, a core thickness, a dielectric thickness, a finish type, a finish thickness, a board technology type, such as High Density Interconnect (HDI), Flex, Stacked Via, or the like, solder mask colors, silkscreen colors, or the like.

The design for manufacturing tool 300 also can receive manufacturing capabilities 302 for manufacturers or suppliers capable of manufacturing the printed circuit board assemblies. The manufacturing of a printed circuit board assembly can include fabrication of a bare printed circuit board based on information in the product model definition 301, and assembly corresponding to placement of components on the bare printed circuit board based on information in the product model definition 301. The manufacturing capabilities 302 can include types of processes the manufacturers or suppliers can utilize to fabricate or assemble printed circuit board assemblies, manufacturing constraints for printed circuit board assemblies manufactured with those different processes, or the like. The manufacturing constraints can correspond to parameters or ranges of values for different manufacturing checks. The manufacturing checks can include one or more manufacturing-based checks, such as drill checks, signal layer checks, power and ground checks, solder mask checks, silk screen checks, profile checks, drill summary checks, board-drill checks, surface mount technology summary checks, pads for drills check, etching analysis checks, surface analysis checks, back drill checks, distortion analysis checks, signal layer net type checks, or the like. The manufacturing checks can include one or more assembly-based checks, such as financial analysis checks, component analysis checks, pad stack analysis checks, test point analysis checks, solder paste analysis checks, pin-to-pad analysis checks, automatic insertion analysis checks, embedded passives checks, alternative parts analysis checks, or the like. The manufacturing checks can include one or more high density interconnect (HDI) checks, such as high density interconnect fabrication solder mask checks, high density interconnect fabrication signal checks, or the like. The manufacturing checks can include one or more microvia checks, such as microvia solder mask checks, microvia signal checks, microvia drill checks, or the like.

The manufacturing checks can include one or more panel checks, such as array analysis checks, or the like. The manufacturing checks can include one or more flex/rigid-flex checks, such as flex board checks, rigid flex checks, inclusion checks, or the like.

The design for manufacturing tool 300 can include a manufacturing constraint unit 310 to identify the manufacturing constraints from the manufacturing capabilities 302. The manufacturing constraint unit 310 can correlate the manufacturing constraints to different physical design characteristics of printed circuit board assemblies. In some embodiments, the manufacturing constraint unit 310 can determine which manufacturing processes correspond to the identified manufacturing constraints, and determine which of those manufacturing processes can fabricate or assemble the different physical design characteristics of printed circuit board assemblies. For example, a physical design characteristic of a printed circuit board assembly can be a thickness of the copper traces in a signal layer. The manufacturing constraint unit 310 can determine that a copper etch process can be utilized to form the copper traces in the signal layer. A length of time to perform the etch process may be dependent on thickness of the copper traces to be formed in the signal layer. Since the length of time to perform the etch process corresponds to a spacing between copper traces in the printed circuit board assembly, the manufacturing constraint unit 310 can correlate a manufacturing constraint of spacing between copper traces on the signal layer to the physical design characteristic of the thickness of the copper traces in the signal layer.

The manufacturing constraint unit 310 can arrange the correlations between manufacturing constraints and physical design constraints in a variety of ways. In some embodiments, the manufacturing constraint unit 310 can group the manufacturing constraints into individual categories and/or an in common set of categories based on correlations to the physical design characteristics of the printed circuit board assembly. For example, each category or collection of manufacturing constraints can correspond to a physical design characteristic of the printed circuit board assembly, such as thickness of copper traces, layer count, board technology type, layer thickness, via size, via location, or the like.

The manufacturing constraint unit 310 also may organize the physical design constraints into different classifications based on their correlated manufacturing constraints. In some embodiments, the classifications can be manufacturer-specific and possibly separated by fabrication type or assembly type of the manufacturer, such as standard or basic manufacture, advanced manufacture, or microelectronic manufacture.

The design for manufacturing tool 300 can include a design-driven check system 320 to analyze the product model definition 301 to identify physical design characteristics associated with a printed circuit board assembly to be manufactured. The design-driven check system 320 can utilize the identified physical design characteristics and the correlation generated by the manufacturing constraint unit 310 to select manufacturing checks and corresponding manufacturing constraints that can be applied to the product model definition 301 during a design for manufacturing analysis.

The design-driven check system 320 can include a design parsing unit 322 to analyze the product model definition 301 describing the printed circuit board assembly to identify one or more of the physical design characteristics of the printed circuit board assembly. In some embodiments, the design parsing unit 322 can identify the physical design characteristics of the printed circuit board assembly from the product model definition 301 in multiple stages. In the first stage, the design parsing unit 322 can parse the product model definition 301 to identify design features that can allow for differentiation between different classifications for the product model definition 301. In the second stage, the design parsing unit 322 can parse the product model definition 301 to identify physical design characteristics indicative of manufacturing process types and that can be correlated to manufacturing constraints from the manufacturing capabilities 302. In some embodiments, in the second stage, the design parsing unit 322 can parse the product model definition 301 layer-by-layer to identify layer type, inner layer or outer layer processing type, a physical design characteristic, structure, or feature, which can be indicative of at least one manufacturing process or manufacturing process type capable of manufacturing at least a portion of the printed circuit board assembly described in the product model definition 301.

The design-driven check system 320 can include a check selection unit 324 to utilize the identified physical design characteristics of the printed circuit board assembly to select one or more manufacturing checks to be applied to the product model definition 301. The check selection unit 324 can apply the identified physical design characteristics of the printed circuit board assembly to the correlations generated by the manufacturing constraint unit 310 to select manufacturing checks and their associated manufacturing constraints for the product model definition 301.

In some embodiments, the check selection unit 324 can classify the product model definition 301 based on one or more of the physical design characteristics, such as a printed circuit board layer count, a board technology type, such as High Density Interconnect (HDI), Flex, Stacked Via, or the like. Each classification of the product model definition 301 can correspond to a sub-set of the correlations between physical design characteristics and manufacturing constraints associated with a particular manufacturer and possibly a particular fabrication or assembly type by that manufacturer. In some embodiments, when the check selection unit 324 can classify a product model definition 301, the check selection unit 324 has determined a manufacturer has the manufacturing processes capable of fabricating or assembling types of physical design characteristics found in the product model definition 301. For example, when the product model definition 301 include a high density interconnect, the check selection unit 324 can assign a classification to the product model definition 301 that corresponds to a manufacturer having the capability of fabricating high density interconnects.

In some embodiments, the check selection unit 324 may attempt to select a manufacturing check or associated manufacturing constraints for a physical design characteristic in the product model definition 301. A failure to select a manufacturing check or associated manufacturing constraints may be indicative of the manufacturer corresponding to the classification not having the manufacturing capabilities to manufacture the types of physical design characteristics found in the product model definition 301.

In some embodiments, the check selection unit 324 can utilize the identified physical design characteristics to select at least one category or collection of categories that identifies a set of manufacturing constraints and corresponding manufacturing checks. The check selection unit 324 can select the manufacturing checks based on a category or the collection of categories of manufacturing constraints correlated to the identified physical design characteristics.

The check selection unit 324 can collect the selected manufacturing checks and associated manufacturing constraints into a check map or map of analysis, which can be utilized a design for manufacturing analysis of the product mode definition 301. By correlating or otherwise associating manufacturing constraints to physical design characteristics in the product model definition 301, the check selection unit 324 can select one or more sets of manufacturing checks to apply to the product model definition 301 that can be customized to specific design features in the product model definition 301. Since the sets of checks can be selected based on manufacturer and manufacturing type by that manufacturer, the sets of checks can be utilized to determine whether which manufacturers can build the printed circuit board assembly on a per-manufacturing type.

The design for manufacturing tool 300 can include a manufacturing analysis engine 330 to perform a manufacturing analysis on the product model definition 301 with the selected manufacturing checks having associated manufacturing constraints. In some embodiments, the manufacturing analysis can identify relationships, such as spacing, line thickness, or the like, in a layout design of the printed circuit board assembly and then compare the identified relationships against a search value corresponding to the identified manufacturing constraints.

The manufacturing analysis engine 330 can indicate which portions of the product model definition 301 passed or failed to pass the manufacturing checks performed in the manufacturing analysis. In some embodiments, the manufacturing analysis engine 330 can filter the results of the manufacturing analysis based on the classifications of the product model definition 301, which can identify whether the product model definition 301 passed or failed to pass the manufacturing checks on a per-manufacturer and possibly a per-manufacturing type basis. When the product model definition 301 passes all of the manufacturing checks performed by the manufacturing analysis engine 330, the printed circuit board assembly described by the product model definition 301 can be fabricated or assembled by each manufacturer associated with the classifications of the product model definition 301.

The manufacturing analysis engine 330 can generate one or more manufacturability events 303 based on results of the manufacturing analysis. In some embodiments, each manufacturing check or category for analysis can have a corresponding search value or parameter, such as a recommended rule value (RRV), which the manufacturing analysis engine 330 can utilize to generate the manufacturability events 303. For example, the manufacturability events 303 can indicate whether the identified relationship in the product model definition 301 was greater or less than the parameter associated with the manufacturing constraint. In some embodiments, the manufacturability events 303 can provide a Boolean value configured to describe the relationship between the manufacturing constraints and a portion of the product model definition 301. The manufacturing analysis engine 330 may also utilize a process tolerance, which can be applied to the parameters and reported in the manufacturability events 303. The manufacturing analysis engine 330 can provide analysis results capable of indicating where the product model definition 301 does not comply with manufacturer capabilities 302, how far out of compliance is the product model definition 301 is with the manufacturing constraints, and could provide a hypothetical potential yield for the fabrication and assembly manufacturing processes.

The manufacturing analysis engine 330 can present the manufacturability events 303, for example, displaying them on a display device. The manufacturing analysis engine 330 also can analyze the manufacturability events 303 to identify portions of the product model definition 301 to present for possible revision based on the manufacturing analysis with the design-driven selection of manufacturing checks. When circuit designers revise the product model definition 301, the manufacturing analysis engine 330 can analyze the revised product model definition to determine those portions affected by the revision and selectively perform a subsequent manufacturing analysis on those portions having been revised. In some embodiments, the manufacturing analysis engine 330 can selectively perform the subsequent manufacturing analysis on a layer-by-layer basis. The manufacturing analysis engine 330 also can compare any manufacturability events 303 generated in the subsequent manufacturing analysis to the manufacturability events 303 generated in the previous manufacturing analysis, and present changes in the manufacturability events 303.

The manufacturing analysis engine 330 can analyze the manufacturability events 303 to identify which manufacturers and processes could fabricate and/or assemble the product model definition 301, for example, without further alterations. In some embodiments, the manufacturing analysis engine 330 can present an approximated cost of the manufacturers and the associated processes, a type of the associated processes, or the like.

The design for manufacturing tool 300 can include a manufacturing-driven design unit 340 to develop a set of design rules for use by a layout design tool in a generation a layout design for a printed circuit board assembly. The manufacturing-driven design unit 340 can receive design constraints corresponding to physical design intentions for the layout design. The manufacturing-driven design unit 340 can prompt the check selection unit 324 to select manufacturing checks having associated manufacturing constraints based on the design constraints, instead of any physical design characteristics parsed from the product model definition 301. The manufacturing-driven design unit 340 can utilize the manufacturing checks selected by the check selection unit 324 to determine whether a layout design subsequently generated based on the design constraints would be manufacturable by one or more of the manufacturers corresponding to the manufacturing capabilities 302.

The manufacturing-driven design unit 340, in some embodiments, can generate design rule checks 304 for use in the layout tool based on the selected manufacturing checks. The design rule checks 304 can be input to the layout tool and allow the layout tool, during the layout process for the printed circuit board assembly, to determine whether their layout design choices by a designer would be manufacturable by one or more of the manufacturers corresponding to the manufacturing capabilities 302.

In some embodiments, the manufacturing-driven design unit 340 can classify the design constraints similarly to the physical design characteristics parsed from the product model definition 301. The manufacturing-driven design unit 340 can prompt the check selection unit 324 to select manufacturing checks having associated manufacturing constraints based on the design constraints on a per-classification basis. The manufacturing-driven design unit 340 can utilize the manufacturing checks selected by the check selection unit 324 to determine which manufacturers, if any, and which manufacturing types, if any, a product model definition having a layout design generated with the design constraints could be manufactured. The manufacturing-driven design unit 340 can generate different sets of the design rules 304 from the selected manufacturing checks on a per-classification basis. The design rule checks 304 can be input to the layout tool and allow the layout tool, during the layout process for the printed circuit board assembly, to determine whether the layout design choices by the designer would be manufacturable. If the designers, during the layout process, make a layout design choice that violates one or more of the design rule checks 304, the layout tool can utilize the design rule checks 304 to inform the designers of which manufacturers or manufacturing types their layout design choices may have excluded from being manufacturable.

Figure 4:
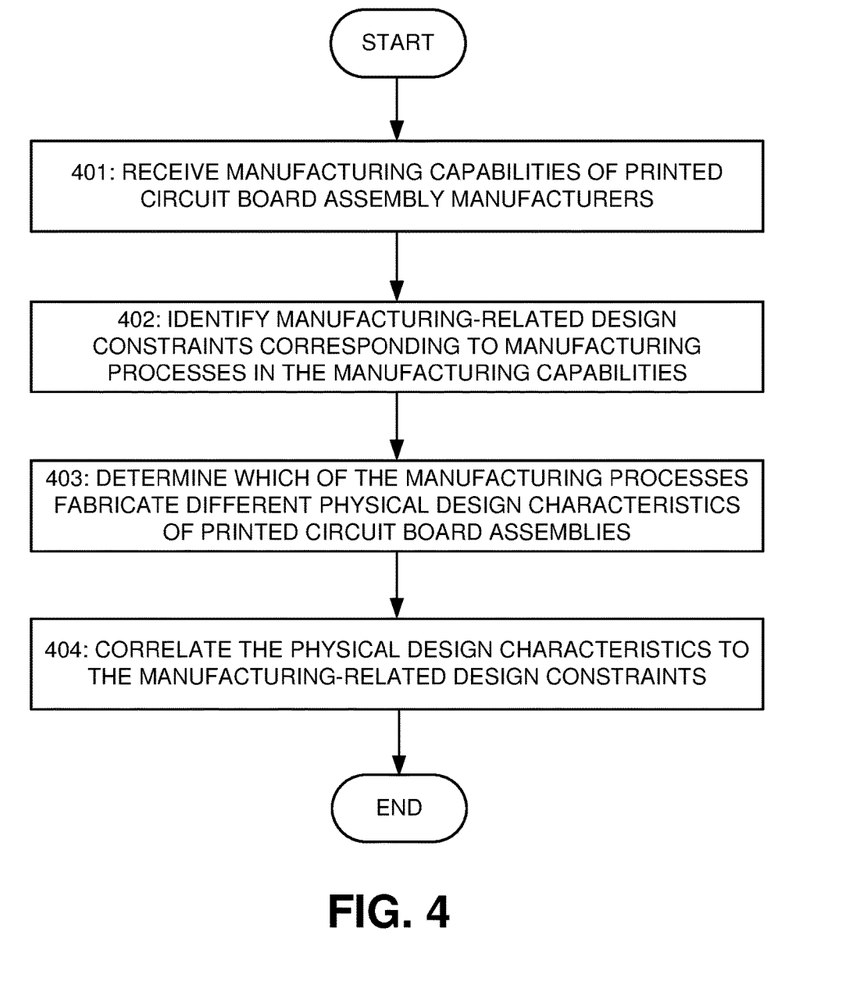
FIG. 4 illustrates an example according to various examples.

FIG. 4 illustrates an example flowchart for correlating manufacturing-related design constraints to physical design characteristics of printed circuit board assemblies according to various examples. Referring to FIG. 4, in a block 401, a computing system implementing a design for manufacturing tool can receive manufacturing capabilities of printed circuit board assembly manufacturers. The manufacturing capabilities can include types of processes the manufacturers or suppliers can utilize to fabricate and/or assemble printed circuit board assemblies, manufacturing-related design constraints for printed circuit board assemblies manufactured with those different processes, or the like.

In a block 402, the computing system implementing the design for manufacturing tool can identify manufacturing-related design constraints corresponding to manufacturing processes in the manufacturing capabilities. The manufacturing-related design constraints can correspond to parameters or ranges of values for different manufacturing checks, such as one or more fabrication-based checks, assembly-based checks, high density interconnect (HDI) checks, microvia checks, panel checks, flex/rigid-flex checks, or the like.

In a block 403, the computing system implementing the design for manufacturing tool can determine which of the manufacturing processes are require by different physical design characteristics of printed circuit board assemblies. In some embodiments, the computing system can receive an input identifying the manufacturing processes that can be used to manufacturer portions of the printed circuit board assemblies having the different physical design characteristics.

In a block 404, the computing system implementing the design for manufacturing tool can correlate the physical design characteristics to the manufacturing-related design constraints based, at least in part, on a commonality of the manufacturing process used to manufacture the portions of the printed circuit board assemblies having the physical design characteristics and the manufacturing-related design constraints imposed by the use of the manufacturing processes. The computing system can arrange the correlations between manufacturing constraints and physical design constraints in a variety of ways. In some embodiments, the computing system can group the manufacturing-related design constraints into individual categories and/or an in common set of categories based on correlations to the physical design characteristics of the printed circuit board assembly. The computing system also may organize the physical design constraints into different classifications based on their correlated manufacturing constraints. In some embodiments, the classifications can be manufacturer-specific and possibly separated by fabrication type or assembly type of the manufacturer, such as standard or basic manufacture, advanced manufacture, or microelectronic manufacture.

Figure 5:
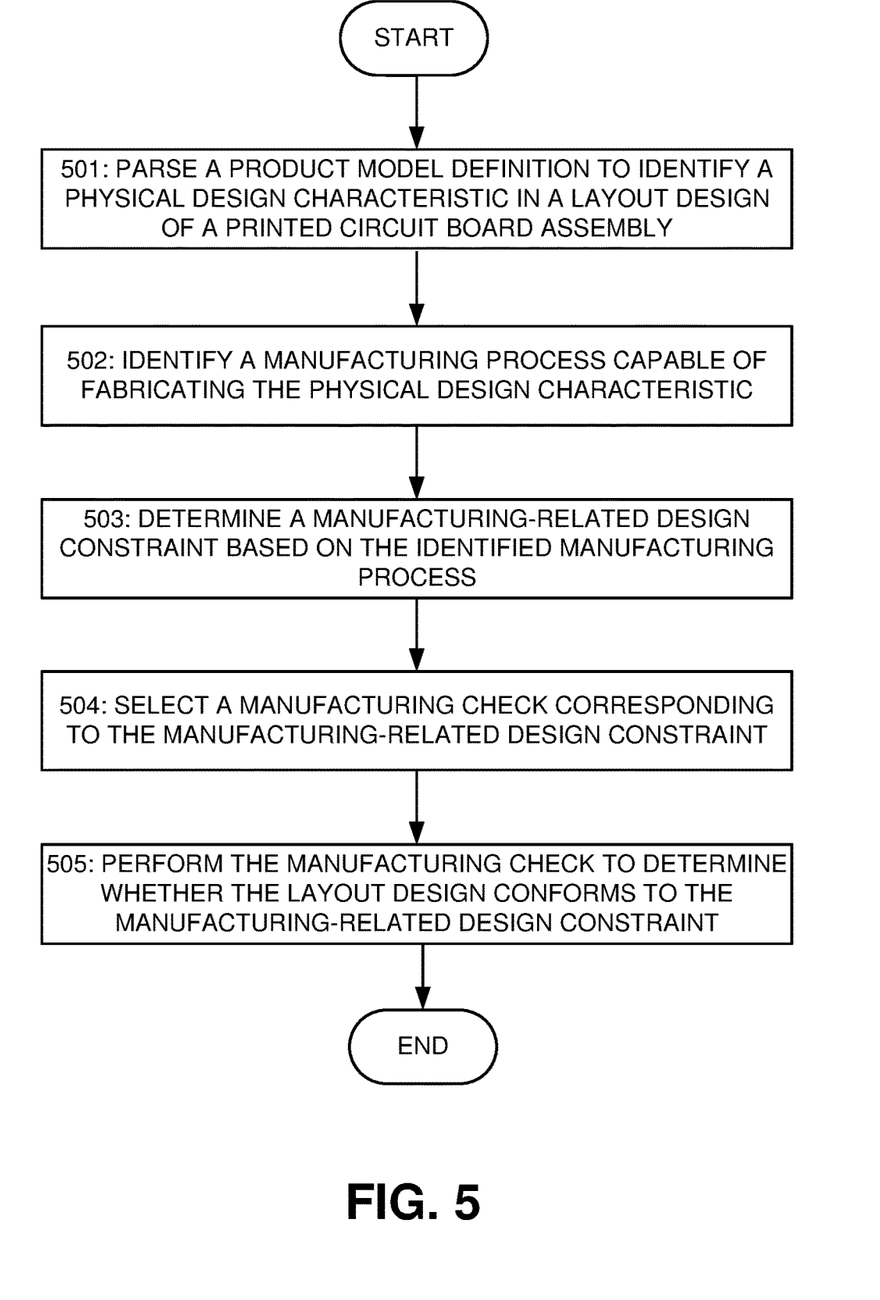
FIG. 5 illustrates an example flowchart for performing design-aware selection of manufacturing checks according to various examples.

FIG. 5 illustrates an example flowchart for performing design-aware selection of manufacturing checks according to various examples. Referring to FIG. 5, in a block 501, a computing system implementing a design for manufacturing tool can parse a product model definition to identify a physical design characteristic in a layout design of a printed circuit board assembly. In some embodiments, the computing system can parse the physical design characteristic of the printed circuit board assembly from the product model definition in multiple stages. In the first stage, the computing system can parse the product model definition to identify design features that can allow for differentiation between different classifications for the product model definition. In the second stage, the computing system can parse the product model definition to identify physical design characteristics indicative of manufacturing process types and that can be correlated to manufacturing-related design constraints from manufacturing capabilities of potential manufacturers for the printed circuit board assembly described in the product model definition. In some embodiments, during the second stage, the computing system can parse the product model definition layer-by-layer to identify layer type, inner layer or outer layer processing type, a physical design characteristic, structure, or feature, which can be indicative of at least one manufacturing process or manufacturing process type capable of fabricating at least a portion of the printed circuit board assembly described in the product model definition.

In a block 502, the computing system implementing the design for manufacturing tool can identify a manufacturing process capable of manufacturing the physical design characteristic. In some embodiments, the computing system can receive an input identifying at least one manufacturing process that can fabricate or assemble a portion of the printed circuit board assembly having the physical design characteristic.

In a block 503, the computing system implementing the design for manufacturing tool can determine a manufacturing-related design constraint based on the identified manufacturing process. The computing system can receive manufacturing capabilities of printed circuit board assembly manufacturers. The manufacturing capabilities can include types of manufacturing processes the manufacturers or suppliers can utilize to fabricate or assemble printed circuit board assemblies, manufacturing-related design constraints for printed circuit board assemblies manufactured with those different manufacturing processes, or the like. The computing system can determine the manufacturing-related design constraints corresponding to the identified manufacturing processes by utilizing an association of the manufacturing-related design constraints to the manufacturing processes in the manufacturing capabilities.

In some embodiments, the computing system can implement blocks 502 and 503 by utilizing a correlation matrix or mapping, which associates the physical design characteristics to manufacturing-related design constraints. The computing system can utilize the physical design characteristic parsed from the layout design of printed circuit board assembly as an input to the correlation matrix or mapping, which can identify the manufacturing-related design constraints correlated to the physical design characteristic.

In some embodiments, the computing system can classify the product model definition based on one or more of the physical design characteristics, such as a printed circuit board layer count, a board technology type, such as High Density Interconnect (HDI), Flex, Stacked Via, or the like. Each classification of the product model definition can correspond to a sub-set of the correlations between physical design characteristics and manufacturing constraints associated with a particular manufacturer and possibly a particular manufacturing type by that manufacturer. In some embodiments, when the computing system can classify a product model definition, the computing system has determined a manufacturer has the manufacturing processes capable of fabricating or assembling types of physical design characteristics found in the product model definition. For example, when the product model definition include a high density interconnect, the computing system can assign a classification to the product model definition that corresponds to a manufacturer having the capability of fabricating high density interconnects.

In some embodiments, the computing system may utilize the classification of the product model definition to select a sub-set of the correlations in the correlation matrix or mapping. When the computing system determines the manufacturing-related design constraint from sub-set of the correlations in the correlation matrix or mapping, the manufacturer corresponding to the classification has the manufacturing processes capable of fabricating or assembling type of the physical design characteristic parsed from the product model definition. When the computing system, however, fails to determine the manufacturing-related design constraint from sub-set of the correlations in the correlation matrix or mapping, the manufacturer and/or manufacturing-type corresponding to the classification may not have the manufacturing capabilities to manufacture the type of the physical design characteristic parsed from the product model definition.

In a block 504, the computing system implementing the design for manufacturing tool can select a manufacturing check corresponding to the manufacturing-related design constraint. The computing system can utilize the determined manufacturing-related design constraint to identify the manufacturing check. In some embodiments, the manufacturing-related design constraint can correspond to parameters or other rule values for the manufacturing check. The computing system can populated a check map or map of analysis with the selected manufacturing check, which can be utilized a design for manufacturing analysis of the product mode definition.

In a block 505, the computing system implementing the design for manufacturing tool can perform the manufacturing check to determine whether the layout design conforms to the manufacturing-related design constraint. The computing system can perform a manufacturing analysis on the product model definition with the selected manufacturing check having associated manufacturing-related design constraint. In some embodiments, the manufacturing analysis can identify relationships, such as spacing, line thickness, or the like, in the layout design of the printed circuit board assembly and then compare the identified relationships against a search value corresponding to the manufacturing-related design constraint.

The computing system can indicate whether the physical design characteristic of the product model definition passed or failed to pass the manufacturing check performed in the manufacturing analysis. In some embodiments, the computing can filter the results of the manufacturing analysis based on the classification of the product model definition, which can identify whether the product model definition passed or failed to pass the manufacturing check on a per-manufacturer and possibly a per-manufacturing type basis.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
  parsing, by a computing system, a product model definition to identify physical design characteristics in a layout design of a printed circuit board assembly;
  utilizing, by the computing system, the identified physical design characteristics of the printed circuit board assembly to select one or more manufacturing checks by:
    identifying one or more manufacturing processes capable of manufacturing at least a portion of the printed circuit board assembly corresponding to the physical design characteristics,
    determining manufacturing-related design constraints that are correlated to the identified manufacturing processes, and
    selecting the one or more manufacturing checks, which define the manufacturing-related design constraints correlated to the identified manufacturing processes; and
  determining, by the computing system, the layout design of the printed circuit board assembly conforms to the manufacturing-related design constraints defined in the manufacturing checks, which indicates the printed circuit board assembly is capable of being manufactured according to the layout design with the identified manufacturing processes.

2. The method of claim 1, further comprising selecting, by the computing system, at least one classification from a set of classifications for the product model definition based on one or more of the physical design characteristics in the layout design of the printed circuit board assembly, wherein selecting the manufacturing checks is based on the physical design characteristics in the layout design of the printed circuit board assembly and selected classification for the product model definition.

3. The method of claim 2, wherein each of the classifications in the set of classifications for the product model definition describe the manufacturing-related design constraints on a per-manufacturer basis.

4. The method of claim 1, further comprising:
comparing, by the computing system, the selected manufacturing checks to manufacturing capabilities of one or more manufacturers; and
determining, by the computing system, which of the one or more manufacturers is capable of manufacturing the printed circuit board assembly from the product model definition based on the comparison of the selected manufacturing checks to the manufacturing capabilities of the one or more manufacturers.

5. The method of claim 1, wherein the manufacturing checks include one or more of a fabrication check, an assembly check, a high density interconnect (HDI) check, a microvia check, a panel check, a flex check, or a rigid-flex check.

6. A system comprising:
a memory device configured to store machine-readable instructions; and
a computing system including one or more processing devices, in response to executing the machine-readable instructions, configured to:
parse a product model definition to identify physical design characteristics in a layout design of a printed circuit board assembly;
utilize the identified physical design characteristics of the printed circuit board assembly to select one or more manufacturing checks by:
identifying one or more manufacturing processes capable of manufacturing at least a portion of the printed circuit board assembly corresponding to the physical design characteristics,
determining manufacturing-related design constraints that are correlated to the identified manufacturing processes, and
selecting the one or more manufacturing checks, which define the manufacturing-related design constraints correlated to the identified manufacturing processes; and
determine the layout design of the printed circuit board assembly conforms to the manufacturing-related design constraints defined in the manufacturing checks, which indicates the printed circuit board assembly is capable of being manufactured according to the layout design with the identified manufacturing processes.

7. The system of claim 6, wherein the one or more processing devices, in response to executing the machine-readable instructions, are configured to:
select at least one classification from a set of classifications for the product model definition based on one or more of the physical design characteristics in the layout design of the printed circuit board assembly; and
select the manufacturing checks based on the physical design characteristics in the layout design of the printed circuit board assembly and selected classification for the product model definition.

8. The system of claim 7, wherein each of the classifications in the set of classifications for the product model definition describe the manufacturing-related design constraints on a per-manufacturer basis.

9. The system of claim 6, wherein the one or more processing devices, in response to executing the machine-readable instructions, are configured to
compare the selected manufacturing checks to manufacturing capabilities of one or more manufacturers; and
determine which of the one or more manufacturers is capable of manufacturing the printed circuit board assembly from the product model definition based on the comparison of the selected manufacturing checks to the manufacturing capabilities of the one or more manufacturers.

10. An apparatus including a memory device storing instructions configured to cause one or more processing devices to perform operations comprising:
parsing a product model definition to identify physical design characteristics in a layout design of a printed circuit board assembly;
utilizing the identified physical design characteristics of the printed circuit board assembly to select one or more manufacturing checks by:
identifying one or more manufacturing processes capable of manufacturing at least a portion of the printed circuit board assembly corresponding to the physical design characteristics,
determining manufacturing-related design constraints that are correlated to the identified manufacturing processes, and
selecting the one or more manufacturing checks, which define the manufacturing-related design constraints correlated to the identified manufacturing processes; and
determining the layout design of the printed circuit board assembly conforms to the manufacturing-related design constraints defined in the manufacturing checks, which indicates the printed circuit board assembly is capable of being manufactured according to the layout design with the identified manufacturing processes.

11. The apparatus of claim 10, wherein the instructions are configured to cause one or more processing devices to perform operations further comprising selecting at least one classification from a set of classifications for the product model definition based on one or more of the physical design characteristics in the layout design of the printed circuit board assembly, wherein selecting the manufacturing checks is based on the physical design characteristics in the layout design of the printed circuit board assembly and selected classification for the product model definition.

12. The apparatus of claim 11, wherein each of the classifications in the set of classifications for the product model definition describe the manufacturing-related design constraints on a per-manufacturer basis.

13. The apparatus of claim 10, wherein the instructions are configured to cause one or more processing devices to perform operations further comprising:
comparing the selected manufacturing checks to manufacturing capabilities of one or more manufacturers; and
determining which of the one or more manufacturers is capable of manufacturing the printed circuit board assembly from the product model definition based on the comparison of the selected manufacturing checks to the manufacturing capabilities of the one or more manufacturers.

14. The apparatus of claim 10, wherein the manufacturing checks include one or more of a fabrication check, an assembly check, a high density interconnect (HDI) check, a microvia check, a panel check, a flex check, or a rigid-flex check.

* * * * *